July 30, 1935.  A. L. BRAY  2,009,985
JORDAN ENGINE
Filed Sept. 5, 1934   2 Sheets-Sheet 1

Inventor
A. L. Bray

July 30, 1935.                A. L. BRAY                2,009,985
                              JORDAN ENGINE
                          Filed Sept. 5, 1934         2 Sheets-Sheet 2
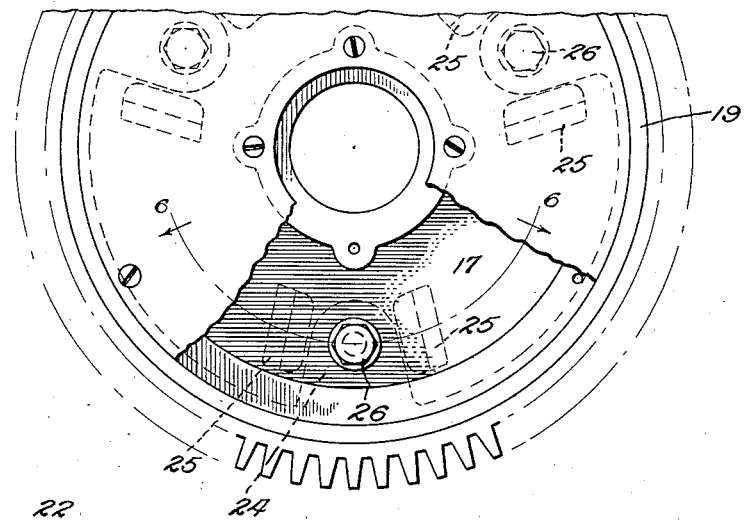
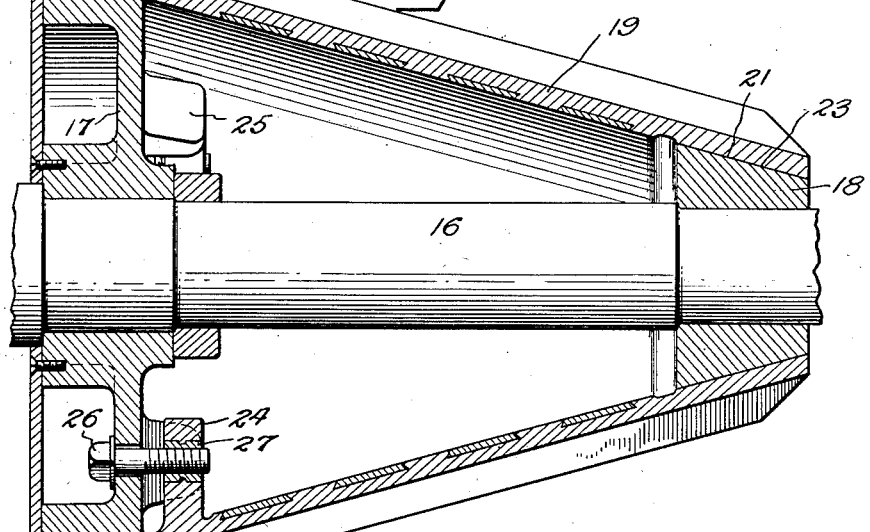
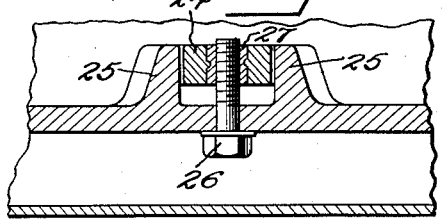
Inventor
A. L. Bray
By
Attorney Patented July 30, 1935

2,009,985

UNITED STATES PATENT OFFICE 2,009,985

JORDAN ENGINE

Alfred L. Bray, Oreland, Pa., assignor to Taylor-Wharton Iron & Steel Company, High Bridge, N. J., a corporation of New Jersey Application September 5, 1934, Serial No. 742,854

1 Claim. (Cl. 92—27)

The invention relates to plug and shell assemblies for Jordan engines and its principal object is to provide simple means whereby the removable shell may be secured to the core centers of the plug in such way as to insure maximum holding without the hazard of shearing while admitting of separation with the minimum of time and labor.

The nature, characteristic features and scope of the invention more readily will be understood from the following description taken in connection with the accompanying drawings, forming a part hereof, wherein:

Fig. 4 is a broken away view of a complete plug assembly, showing a modified construction.

Fig. 5 is a longitudinal central section of Fig. 1.

Fig. 6 is a section on line 6—6 of Fig. 4.

Figure 1:
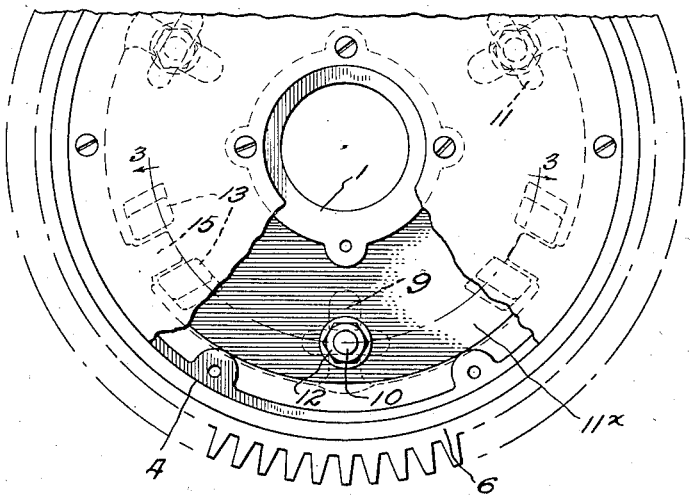
Figure 1 is a broken front view of the improved plug in complete assembly.
Figure 2:
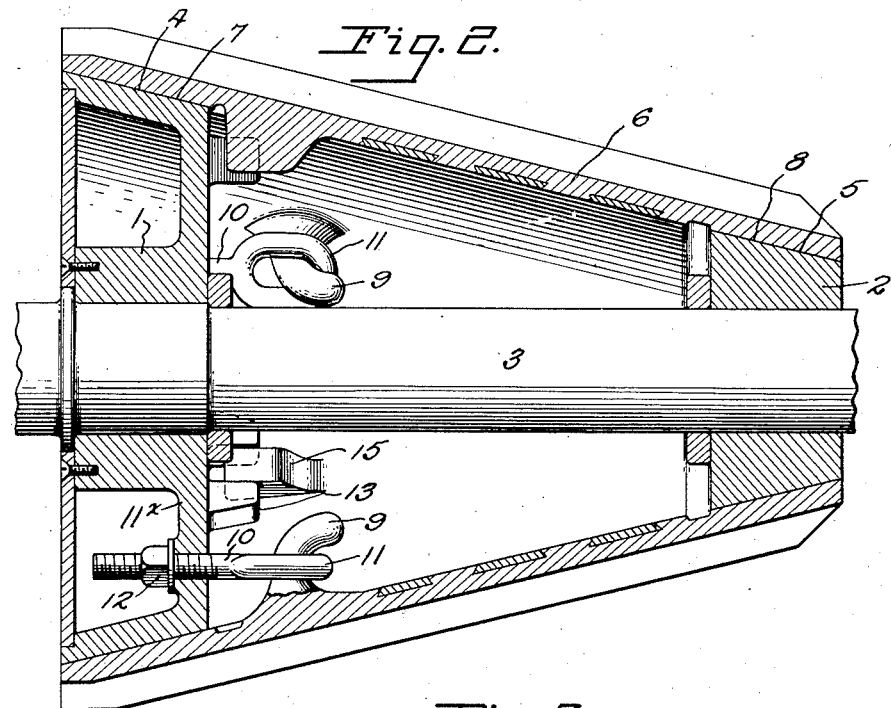
Fig. 2 is a longitudinal central section of the same.
Figure 3:
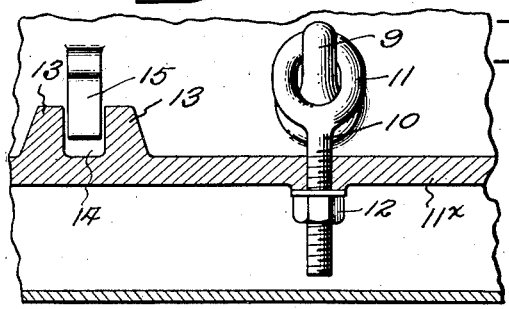
Fig. 3 is a section on line 3—3 of Fig. 1.

With particular reference to Figs. 1 to 3, inclusive, the improved construction includes core centers 1 and 2, fixed in spaced relation on the usual shaft 3, and having peripheral tapered surfaces 4 and 5, respectively, which respond to the desired conical shape of the plug.

A separate shell 6, exteriorly formed as desired, is interiorly formed with tapered surfaces 7 and 8 for accurate wedging interfit with the tapered surfaces 4 and 5 of the core centers. The inner surface of the shell, near the larger end thereof, is formed or provided with hooks 9, the bills of which project toward the smaller end of the shell. Shell tightening or draw bolts 10, with rings or eyes 11, are provided to removably engage the hooks 9, the bolts passing through radial web portion 11$^x$ of the core center 1, and cooperating with nuts 12 to admit of relative wedging action of the shell and core centers for tightening purposes.

In order to relieve shearing on the bolts under operating conditions, the spider or end wall 11$^x$ is formed with projections 13, defining channels 14, to receive lugs 15 on the shell which serve to solicit angular stress.

In the illustration shown in Figs. 4-6, inclusive, the shaft 16 is provided with core centers 17 and 18. The removable shell 19 is formed or provided with tapered surfaces 20 and 21 to cooperate with tapered surfaces 22 and 23 on the respective core centers 17 and 18. In this illustration the shell is provided with lugs 24, adapted, when the shell is in applied position, to fit between spaced abutments 25, projecting from the radial web portion of the larger core center. Cap screws 26 pass loosely through the wall of the core center and have threaded connection with the lugs 24, or with appropriate fillings 27. In this form the relative arrangement of the lugs 24 and abutments 25 is effective to eliminate shear on the cap screws 26.

It will be understood that the tightening of the bolts 10 in the one case, and of the cap screws 26 in the other case, serves to draw the shell onto the tapered surfaces of the core centers in properly centered relation and to compel a wedging cooperation of the shell and core centers. Thus, practically a unitary, rigid construction is provided which, at the same time, admits of convenient and simple disconnection of the shell when necessary for replacement or other purposes.

Having described the invention, what is claimed is:—

A Jordan plug comprising plug centers, a shell removably fitted to said centers, lugs on the shell and lugs on one center constituting abutments to relieve shear, and means carried by a center and having threaded connection with the shell lugs and effective to establish wedging action.

ALFRED L. BRAY.